United States Patent Office 2,977,756
Patented Apr. 4, 1961

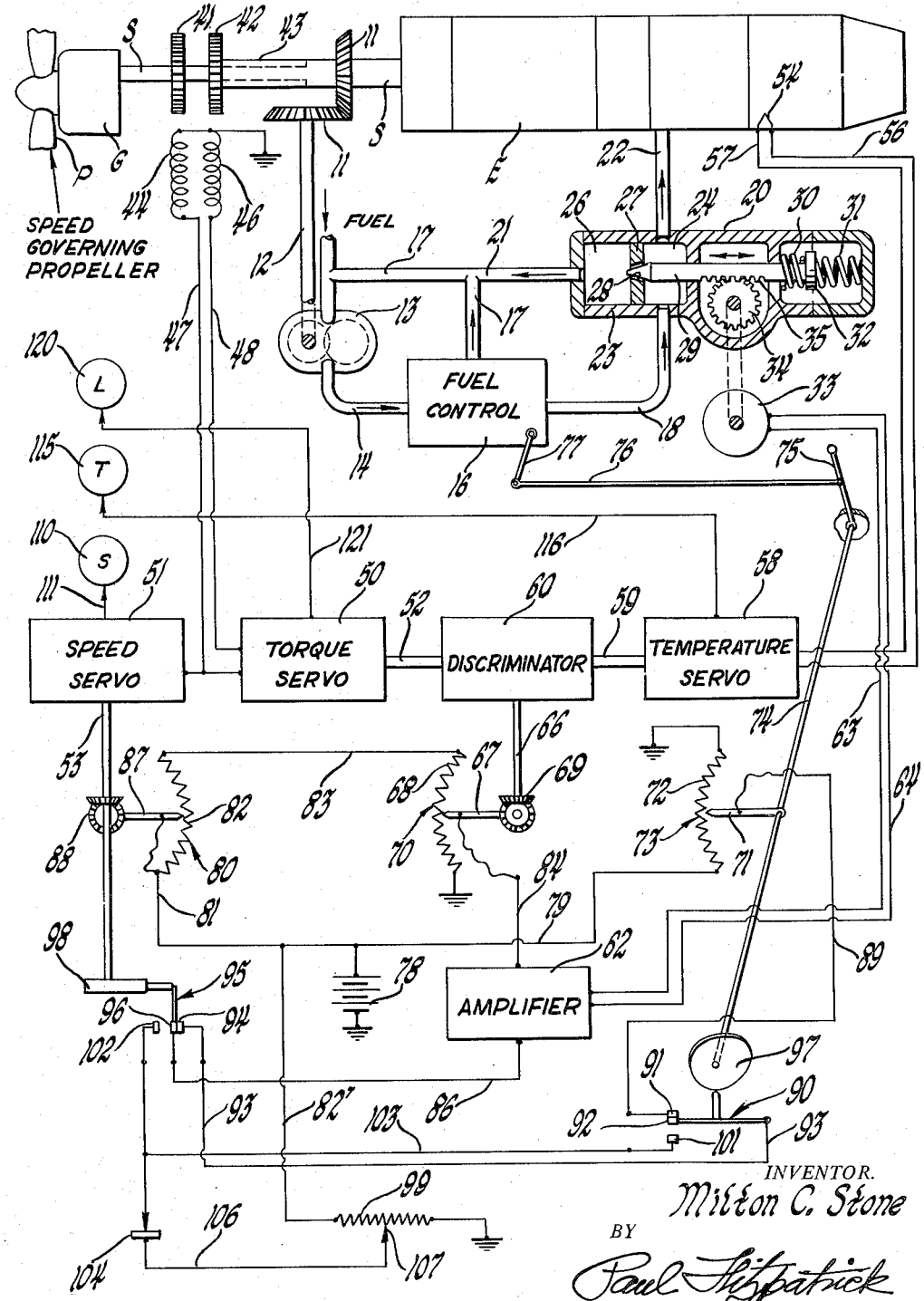

2,977,756

FUEL CONTROL FOR A TURBO-PROP ENGINE USING OPERATING LIMITS OF POWER OUTPUT TEMPERATURE

Milton C. Stone, Carmel, Ind., assignor to General Motors Corporation, Detroit, Mich., a corporation of Delaware Filed Mar. 26, 1956, Ser. No. 573,935

13 Claims. (Cl. 60—39.28)

This invention relates to controls for gas turbine propeller aircraft power plants, commonly called turbo-prop engines. The invention is principally directed to providing a control for such an engine which concurrently schedules an internal engine operating limit condition such as turbine inlet temperature and an external engine power output limiting condition such as power or torque, the values of both these conditions being subject to control to establish in general the operating conditions of the engine, including means by which the actual control of the engine is exercised by whichever of the two factors, the internal or the external, requires the lower supply of fuel to the engine.

One of the limits to the power output of a gas turbine engine is the temperature of the motive fluid reaching the turbine. Under normal full power output conditions this temperature should be maintained at a value just below a level which would cause rapid deterioration of the turbine. It is also important, to guard against damage, not to overspeed the engine, but it is usual with propeller driving engines to operate them in the flight range at constant speed, governed by the propeller.

Another limit to the output of such an engine may arise from mechanical considerations of the load capacity of the reduction gear through which the engine drives the propeller or of the shafting within the engine. There is ordinarily a maximum power output which is considered safe for a particular power plant. Since such power plants usually operate largely at high altitudes, they are ordinarily capable of full rated power at altitudes where the density of the air is considerably less than at sea level. The density of the ambient air, the temperature of the air, and the influence of ram due to forward speed of the aircraft all affect the amount of power that can be developed by the engine. Thus, an engine which is capable of developing its normal rated output at, say, 15,000 feet at average temperatures might be capable of delivering about 50 percent over its rating at sea level on a cold day under forward speed conditions. The control system of the present invention provides for control of the power output of the engine by varying the fuel flow thereto, as is customary. However, the controlling parameter by which the fuel flow is determined may be either turbine temperature or power output and the control will automatically respond to the parameter which dictates the lower rate of fuel input. Thus, the fuel is limited to prevent excessive temperature where the conditions are such that the engine cannot develop full rated power without excessive temperature and is limited by power output where the conditions are such that full rated power may be generated at a motive fluid temperature below the safe maximum.

It will be understood that the output of the engine may be controlled to establish any output level between the maximum available and a minimum value which may be zero power output or slightly below. There is no definite lower limit to turbine inlet temperature. Of course, the fuel supply must be maintained sufficiently high to maintain combustion. The usual lower limit to engine power output is a slightly negative value so that the engine can exert a slight braking effect when the aircraft is making a landing approach. In accordance with the invention, therefore, fuel regulating means are provided controlled both by a variable engine temperature setting and a variable engine power output setting, but controlled at any given time only by the one which gives the lower values of temperature and power. The control system according to the preferred embodiment of the invention involves additional features accommodating the control to landing approach conditions and idling operation of the engine.

The principal objects of the invention are to provide an improved control for turbo-prop engines, to provide a system which automatically prevents excess temperature or excess power generation over what is desired and over safe limits, to provide precise power control under landing approach conditions, to provide a control system which is largely operated by compact and reliable servo-mechanisms which may be mounted separately from the engine, and to facilitate the provision of indications for the pilot or flight engineer of engine operating conditions.

The nature of the invention and the advantages thereof will be more fully apparent from the succeeding detailed description of the preferred embodiment of the invention and the accompanying drawing, which is a schematic diagram of a control system.

Referring to the drawing, the control is applied to a gas turbine engine E, shown in outline, which drives, through a shaft S and a reduction gear G, a propeller P, which should be of a variable pitch speed governing type. The engine also drives, through gearing indicated at 11, a drive shaft 12 for the engine fuel pump 13. Fuel supplied from any suitable source to pump 13 is delivered through conduit 14 to a main, or hydraulic, fuel control device 16, which may be of any suitable hype. Such controls ordinarily meter fuel to the engine under control of the pilot to determine the output level of the engine. They ordinarily control the fuel in accordance with the setting of the power control, the temperature and density of the air entering the engine, and the rotational speed of the engine, and may include an overspeed governor to safeguard the engine against overspeeding and means to regulate the rate of increase or decrease of fuel feed when the engine power level is changed. Such fuel controls are well known, and the present invention does not depend upon the details or mode of operation of the fuel control. However, it is desirable in the system for certain purposes. The fuel control 16 may operate by returning part of the fuel supplied by pump 13 through a line 17 to the inlet of the pump. The metered fuel is discharged through line 18 to a datum valve fuel control device 20 which finally determines the amount of fuel to reach the engine by returning excess fuel through lines 21 and 17 to the pump inlet. The remaining fuel is supplied through line 22 to the combustion system of the engine. In order for the datum valve 20 to be effective, control device 16 is scheduled to supply an excess of fuel over the engine requirements, such as a 15 percent excess. The datum valve may deliver to the engine from 50 to 100 percent of the fuel metered by the control 16. Thus, it may increase the fuel above the normal scheduled amount by 15 percent or may reduce it substantially below the scheduled amount. The datum valve of the fuel control, therefore, ultimately determines within rather wide limits the fuel reaching the engine.

The datum valve 20 comprises a housing 23 defining an inlet chamber 24 and an outlet chamber 26 separated by a wall 27 within which is an orifice 28 varied by an axially movable valve stem 29. The valve stem may be biased to a normal or null position, in which some 15 percent of the fuel is by-passed, by compression springs 30 and 31 acting on opposite faces of a head 32 of the valve stem. Power means are provided for adjusting the valve, such as an electric motor 33 coupled through a mechanical power transmission indicated as a gear 34 and a rack 35 on the valve stem, so that rotation of the motor adjusts the valve stem. A reduction gearing (not shown) may be provided between the motor and the valve.

The fuel system, as so far described with reference to the drawing, was known prior to this invention, which is directed to the control of the valve 20. The prior system is disclosed in application Serial No. 496,094, now patent No. 2,938,340, of Boyer et al, for Temperature Datum Gas Turbine Control, filed March 23, 1955. In the previous system, however, valve 20 was controlled in response to temperature in the engine, the present invention being directed to the addition of the power control to the temperature control and other features of this system which will be described.

To effect the power control, means responsive to engine power output is required, which preferably is an electric torque meter of the type described in U.S. Patent 2,766,617. As illustrated diagrammatically, the torque meter comprises two toothed wheels 41 and 42, wheel 41 being mounted on the shaft S and wheel 42 being mounted on a hollow reference shaft 43 fixed to the shaft S at a point remote from the wheel 41. As will be apparent, torque transmitted through shaft S will cause twisting of the shaft which will alter the relative rotational position of wheels 41 and 42. Wheels 41 and 42 are associated with pickup coils 44 and 46, respectively. The combination of the wheel and its corresponding pickup coil constitutes an electric transmitter or generator which provides an alternating current the frequency of which is dependent upon the speed of rotation of the wheel. The phase relation of the potential of coils 44 and 46 is determined by the phase relation of wheels 41 and 42 and thereby by the twist of the shaft S, so that this phase angle is a linear function of the torque transmitted by shaft S. Since the shaft operates at substantially constant speed during the times when the torque meter is relied upon for control of the engine, torque is a satisfactory measure of power.

The voltage generating or pickup coils 44 and 46 are connected by leads 47 and 48 to a torque servomechanism 50 which measures the phase displacement of the two generators and thereby the torque. Lead 47 is also connected to a speed servomechanism 51 which measures the frequency and thereby the speed of rotation of shaft S. The torque servo 50 rotates a shaft 52, the angular position of which is proportional to torque. The speed servo 51 rotates a shaft 53, the angular position of which varies linearly with shaft speed.

The temperature control for valve 20 is derived preferably from a number of thermocouples located in the turbine inlet of the engine, represented on the schematic by a single thermocouple 54, the terminals of which are connected by leads 56 and 57 to a temperature servomechanism 58. The temperature servo is a mechanism which rotates an output shaft 59 proportionally to the thermocouple E.M.F. and, therefore, to the turbine inlet temperature.

The angular positions of shafts 52 and 59 provide the primary control means for the datum valve 20, the control being exercised through a discriminator mechanism 60 and electric circuits including a servo amplifier 62 connected through output leads 63 and 64 to the motor 33.

The discriminator is preferably a mechanical device such as that disclosed in U.S. Patent 2,778,241. This distriminator is a device having input shafts 52 and 59 and an output shaft 66 and having mechanical coupling means within the discriminator so that shaft 66 is coupled to and rotates with whichever one of the input shafts is farthest advanced from an arbitrary datum position. In this case, the output signal represented by the rotation of the shaft 66 will correspond either to the torque input represented by rotation of shaft 52 or the temperature input represented by rotation of shaft 59, depending upon which is farther from its initial position. The output shaft 66 of the discriminator drives the movable contact 67 over slide wire 68 of a potentiometer 70 through suitable mechanism, indicated schematically as gears 69. The position of this movable contact thus represents the value of the engine condition which is relied upon for control of fuel. The desired value of the limiting condition is set by the movable contact 71 and slide wire 72 of a potentiometer 73. This contact is adjusted by an engine power control lever 75 operated by the pilot or flight engineer which is connected to the potentiometer arm as by a rotatable shaft 74. The power control 75 is also coupled, as by a link 76, to the input or control arm 77 of the fuel control device 16.

Thus, as the power control lever sets the fuel control device 16 for the primary metering of the fuel, it also adjusts the contact 71 to provide a signal for control of the datus valve 20.

Potentiometers 70 and 73 are connected in a bridge circuit which provides the input to the valve control servo amplifier 62. This bridge circuit is energized from a suitable source of potential, indicated by the battery 78 connected through lead 79 and potentiometer winding 72 to ground. Battery 78 is also connected through lead 81, a variable resistance 80, lead 83, and potentiometer winding 68 to ground. Movable contact 67 is connected through lead 84 to the valve control amplifier. Movable contact 71 is also connected, through switching mechanism to be described, to the other input lead 86 of the amplifier. Any difference of potential between the contacts 67 and 71 will provide a potential difference to the amplifier proportional to the magnitude of the error in the engine controlling parameter with respect to the control signal established by potentiometer 73. The polarity of the input signal indicates the sense of the error. Amplifier 62 provides a signal to control motor 33 so that if the control signal is greater than the response signal, the motor is operated to close the valve and thereby increase the flow of fuel to thet engine. If the conditions are reversed, the valve is opened to decrease fuel flow.

In normal engine operation in flight, the contact 71 is directly connected through switches to amplifier input lead 86. Also, in normal flight, the valve of resistor 80 remains constant at zero. This resisatnce is increased by a movable contact 87 which shunts a part of the resistance wire 82 and is driven through gearing indicated at 88 by the speed signal or output of the speed servo through shaft 53. If the engine speed decreases, the value of resistance 82 is increased for a reason which will be explained.

Tracing now the normal connection from potentiometer contact 71 to the amplifier 62, this circuit is through lead 89, normally closed contacts 91 and 92 of switch 90, lead 93, normally closed contacts 94 and 96 of switch 95, and lead 86. Fixed contact 91 engages movable contact 92 whenever the power control lever 75 is advanced into the flight range. This contact is moved by a cam 97 mounted on shaft 74. Contact 94 is a fixed contact normally engaged by movable contact 96 which is actuated by a cam 98 on speed servo output shaft 53. Contact 96 is held in engagement with contact 94 at the normal propeller governed operating speed of the engine and until the engine speed drops to a predetermined value such as 10 percent below this speed. The cam operated switches 90 and 95 operate to transfer control of the amplifier 62 from the power lever controlled potentiometer 73 to a normally fixed adjustable potentiometer 99 whenever engine speed falls to a predetermined value such as 90 percent of rated speed or the power control is moved below the flight range. The normally open contact 101 of switch 90 and the normally open contact 102 of switch 95 are connected through a common lead 103, a rectifier 104, and lead 106 to the adjustable contact 107 of potentiometer 99. This potentiometer is energized from the battery 78 through leads 81 and 82'. When either switch is moved from the position shown on the drawing, the circuit from contact 71 to lead 86, which passes through both normally closed contacts in series, is opened and the circuit from adjustable contact 107 to lead 86 is established.

It will be understood that the switches 90 and 95 are shown schematically and that they preferably will be quick acting snap type switches so that the movable contact moves immediately from one fixed contact to the other when the switch is operated by its cam.

The rectifier 104 inserted in the lead to the potentiometer 99 makes this potentiometer effective only as a limiting potentiometer. In other words, the signal from this potentiometer cannot operate the datum valve 20 to increase fuel to the engine but may only reduce fuel in case engine power output or temperature is higher than that called for by the setting of the potentiometer 99. A signal from potentiometer 99 calling for a decrease in fuel will be transmitted by the rectifier 104 but a signal calling for increase in fuel will be blocked by the rectifier. When in this control regime the datum valve 20 normally receives no signal from the amplifier 62 and therefore the fuel supplied to the engine is controlled entirely by the main fuel control 16, unless for any reason this fuel control provides sufficient fuel to drive the engine temperature or power output above the values corresponding to the setting of adjustable contact 107, in which case the amplifier will operate to open the valve to bypass fuel above the arbitrary 15 percent and reduce the engine power and temperature. This mode of operation of the datum control is primarily a safety feature.

The internal structure and mechanism of the speed servo, torque servo, temperature servo, discriminator, and amplifier 62 need not be described, since the internal mechanism of these devices is immaterial to the invention. Suitable devices for these purposes are known, and this invention is concerned with the system rather than with the details of the components mentioned, which may be of any suitable internal structure so long as they provide the output signals accurately from the inputs supplied them. Likewise, the power supplies to the servo devices are omitted from the drawing in the interest of simplicity.

Since, in connection with the operation of the described system, the speed, torque, and temperature servos drive shafts to positions representative of the engine torque and therefore the engine power output, the engine speed, and the turbine inlet temperature, these shafts may be coupled to any other device which may be useful for control of the engine and propeller in response to any of these parameters. This is another advantage of this system, since it makes possible the elimination of various engine auxiliary devices such as other torque responsive indicators or devices to operate emergency feathering controls or engine failure fuel shutoff devices, speed responsive switches for control of various engine functions, and tachometer generators for speed indication. Preferably, the system provides for remote indication of the speed, torque, and temperature of the engine for the information of the pilot and flight engineer. Such indication may be provided by speed indicator 110 coupled through a suitable transmission system 111 to the speed servo, temperature indicator 115 coupled through a suitable transmission system 116 to the temperature servo, and a torque indicator 120 coupled through a suitable transmission system 121 to the torque servo. These indicators may be of the well known self-synchronous type coupled electrically to self-synchronous transmitters in the servo devices driven by the same mechanisms which drive the output shafts of the servos. Such self-synchronous instruments are superior to the usual galvanometric indicators ordinarily coupled to thermocouples, tachometer generators, and electronic torque meters. If desired, indicators may be provided at more than one station.

It may be noted that the speed servo, torque servo, temperature servo, discriminator, and amplifier may be mounted remotely from the engine, since they are coupled to the engine only through electric leads and that these devices may be assembled in a single compact control unit. Preferably, the servo devices and amplifier are types employing transistors or magnetic amplifiers rather than thermionic tubes because of the unreliability of thermionic tubes.

Proceeding now to a description of the operation of the system as employed in an aircraft, it may be assumed that the manual power control 75 is operated through a range which may be considered to be from zero degrees to 90 degrees. The portion from zero to 30 degrees serves to provide for starting of the engine and possible reverse thrust operation for braking on the ground with the propeller in blade angle rather than governing control. The range from 30 degrees to 90 degrees provides for increasing engine power from a flight idle position at 30 degrees to a military or takeoff power rating at 90 degrees. This portion may be called the flight range, and in this range the engine speed is controlled by a fixed speed governor in the propeller controlling through variation of propeller blade angle. The mechanical connection from the power control lever through 76 and 77 to the fuel control is scheduled for gradually increasing engine output and temperature from a minimum at the flight idle position to a maximum at the takeoff position. Since the fuel control 16 operates to regulate the quantity of fuel in response not only to the setting of lever 77 but also in response to temperature and pressure of incoming air, it inherently operates to meter fuel to provide a power output and temperature proportional to the maximum available. In other words, the fuel control modifies the fuel supply to reduce engine power output as air density decreases or air temperature increases. However, it will be remembered that this control is set to provide an excess of fuel over the experimentally determined or calculated engine requirements throughout the range of power lever settings, which excess may be 15 percent. If the datum valve is in null position due to the absence of a signal in lines 63 and 64 tending to move the valve away from its null position, this 15 percent excess fuel is bypassed through line 21 and the engine receives the scheduled fuel requirement. Since the main fuel control 16 cannot compensate entirely satisfactorily for variations in ambient conditions and forward speed of the aircraft as well as variations in fuel density, this control directly by the main fuel control is not entirely satisfactory. This is particularly true in a landing approach, where accurate control of power delivered by the engines is highly desirable and where rapid changes in ambient conditions and forward speed of the aircraft usually associated with the landing approach cause the main fuel control 16 to vary the power output of the engine.

Therefore, the system according to the invention couples the power control 75 also to the torque and temperature datum controls. As the power control is advanced from the 30 degree flight idle position to the 90 degree takeoff position, the control signal generating potentiometer 73 is adjusted to provide an increasing signal. This potentiometer may provide a linear increase in potential and, therefore, of the control signal in relation to the angular position of the control 75, or it may be non-linear if this provides a more satisfactory variation of the control signal. The outputs of the servos, that is, the angular positions of shafts 52, 53, and 59, are preferably linear functions of torque, speed, and temperature, respectively. The potentiometer 70 is preferably linear, although the relation between the position of contact 67 and voltage tapped from the potentiometer may be non-linear if desired.

The position of contact 71 may be regarded as concurrently scheduling a torque or power output value and a value of engine temperature. In other words, for each position of contact 71 there is a value of engine temperature which will equalize the potential derived by contact 67 with that derived by contact 71. Likewise, there is also a value of engine torque which will equalize the potential derived by contact 67 with that scheduled by contact 71. It may be noted that no mention is made at present of variable resistance 80, since the effect of this on the system is intermittent. When the propeller is operating at its fixed governing speed, the value of resistance 80 is constant, preferably zero.

Therefore, as the power control lever is advanced through its range from flight idle to takeoff, the datum valve 20 will be controlled by either the torque signal or the temperature signal, depending upon which of shafts 52 and 59 is farthest advanced and will be coupled by the discriminator to output signal shaft 66. If this signal value is above that scheduled, an input will be supplied amplifier 62 to drive the motor 33 to open the datum valve and reduce the fuel supplied to the engine. If the signal farthest advanced is below that called for by lever 75 and contact 71, a signal will be supplied to the amplifier causing it to close the valve and reduce the amount of fuel bypassed below the null value of 15 percent so as to increase engine temperature and torque.

As an example of the operation of the system, the engine horsepower may be scheduled from approximately 250 minus horsepower at flight idle to 4500 horsepower at takeoff. The turbine inlet temperature may be scheduled from approximately 1500 degrees Rankine at flight idle to 2200 degrees at takeoff. Whenever conditions are such that the scheduled horsepower output can be obtained without exceeding the temperature scheduled, the engine will be controlled accurately to the power schedule. Whenever the conditions are such that the scheduled turbine inlet temperature can be attained without exceeding the scheduled power rating, the engine will be controlled accurately to the desired temperature. In actual operation, control may shift from torque limiting to temperature limiting at various positions in the range of control from 30 degrees to 90 degrees, depending upon barometric altitude, temperature, and forward speed of the aircraft which varies the ram effect. In a particular installation, at lea level under unity ram and standard atmospheric conditions, the torque or power signal ordinarily limits the engine up to about 60 degrees power lever position, above which the temperature signal becomes effective. At higher aircraft speeds and lower temperatures the engine is capable of developing greater power for a given turbine temperature and the torque servo may remain in control of the engine through the entire power range. In flight at high altitudes, such as 45,000 feet, since the engine is capable of developing less power, temperature may control from approximately the 40 degree position of the power lever. The transition from one mode of control to the other is entirely automatic and without discontinuity in the operation of the engine. Such a transition may occur because of changes of power lever position, changing the power demand, or changes in altitude or temperature.

As a result of this system of control, the pilot and flight engineer are relieved of the necessity of limiting the advance of the power lever at low altitudes and on cold days to prevent overloading of the reduction gear due to the excess power capacity of the engine. The power control may be set at the 90 degree position and the engine will automatically be limited to its maximum rated power output and it will be held at this value during takeoff until the power control setting is changed or the aircraft climbs to an altitude which the gradual increase in turbine temperature with altitude at the fixed power setting causes the temperature control to take over and operate the engine at the scheduled temperature. Normally, after takeoff and climb, the power control is moved back from the takeoff position to a cruise position calling for a somewhat lower temperature condition conducive to longer engine life. This, of course, reduces the power limiting setting and the temperature limiting setting, but at high altitude the temperature control ordinarily dominates.

When the airplane descends for a landing, the power control is ordinarily moved toward a lower power position, and when the landing approach is made, it may be put in the flight idle position to cause the engine to develop slightly less than zero horsepower, such as 250 negative horsepower, so that it has a slight braking effect on the propeller and therefore on the plane. Because of the forward speed of the aircraft, the propeller will windmill and provide the small amount of power necessary to keep the engine operating at the governing speed of the propeller. As the aircraft speed decreases, the power input from the propeller to the engine tends to decrease and, therefore, the speed of the engine and propeller. The propeller governor, however, responds to any decrease in engine speed by reducing the pitch of the propeller to maintain the propeller and engine speed at the governor setting.

It is contemplated that the aircraft forward speed before or at touchdown will decrease to a value such that the propeller governor will have moved the propeller to the limiting low pitch value in the propeller governing operation. When this condition is reached, any further decrease in forward speed will reduce the power supplied the engine by the propeller and, since the governor can no longer correct this condition, the engine speed will decrease. At this point the variable resistance 80 controlled by the speed servo comes into operation to maintain engine speed substantially constant with a slight droop. As the engine speed drops below the rated value, the movable contact 87 moves to increase the value of resistor 80 from its zero value at rated governing speed, thus lowering the drop across potentiometer 70 and thereby the potential sensed by contact 67. This provides a signal to the amplifier 62 indicating underpower in the engine which drives the datum valve 20 to reduce the amount of fuel bypassed. As will be seen, the increase of resistance in response to drop of speed has the same effect on the operation of the system as a slight advance in the power control lever 75 which would also call for greater output, but renders manual adjustment of control 75 unnecessary. Effectively, the resistance 80 as it increases provides a decrease in the output signal from shaft 66. The same result could be obtained by coupling shafts 53 and 66 to gears 69 through a differential or by cutting out resistance in series with potentiometer 73 or mechanically shifting contact arm 71 relative to shaft 74. therefore, as the engine speed tends to drop below the governing value the variable resistance 80 acts as a speed governing input to the datum valve to increase fuel and thereby minimize any drop in engine speed by increasing the power output of the engine so that it is capable of driving the propeller at substantially rated speed notwithstanding the falling off of power from the windmilling propeller. Even if the airplane comes to a stop on the runway, the engine will be maintained in operation at near the normal speed because of the increase in fuel due to the action of the speed governing resistance 80. As an example of desired operation of the speed governing resistor, it may be capable of raising the engine power output from approximately minus 250 horsepower at rated speed to approximately plus 250 horsepower at 90 percent of rated speed. The engine will normally be maintained in operation at about 95 percent rated speed if the power lever is left in the flight idle position after landing.

If the power control lever is moved out of the flight range after landing, the cam operated switch 90 cuts out the controlled potentiometer 73 and connects fixed potentiometer 99 which, as previously stated, acts merely to limit the temperature or power output of the engine. Under these circumstances the valve 20 goes into its null position and the fuel is metered by the fuel control 16 unless temperature or power exceed the values called for by the setting of contact 107.

Also, if engine speed drops below 90 percent of rated, cam operated switch 95 transfers control to potentiometer 99. In this case the fuel control 16 takes over; but this normally does not occur when the power control lever is in the flight range, since engine speed will not ordinarily drop below 90 percent of rated speed. This provides a secondary control, however, supplementing the power lever operated switch 90 to ensure operation of the datum valve only as a limiting control in the taxi and ground idle (blade angle control) regime below 30 degree power lever position.

It will be apparent that the control system of the invention, by maintaining operation of the engine at constant torque, will provide constant positive or negative power from the engine during the landing approach. In multi-engine aircraft, the engines will be similarly controlled at the same power output and will maintain the same speed unless the aircraft speed drops to a point where the propellers reach their low pitch stops, in which case pitch remains constant and propeller r.p.m. will be held substantially constant, thus containing to maintain a substantially constant and equal power output of all the engines. It may be pointed out that the temperature schedule is normally higher relatively than the torque schedule at power lever settings employed during a landing approach, so that no interference with the torque control will be created by the temperature control.

It will be apparent that the fuel control comprising the main fuel control 16 and the datum valve 20 has two modes of operation. Normally, in the flight range, the metering of fuel is performed by the datum valve which completely determines the fuel flow to the engine. In the fixed blade angle or beta control range below the 30 degree power control position, the main fuel control 16 normally controls the engine and the datum valve normally remains in the null position, except that it can open to reduce fuel in the event of excessive power generation or temperature. The datum valve is capable of higher accuracy in control of temperature or power than the main fuel control. However, the main fuel control is desirable, and it is not desirable to rely upon the datum valve entirely to bypass the excess discharge from the pump 13, because the main fuel control can effectively meter fuel to the engine in the event of failure of the datum control system. Also, it is desirable for ground operations, taxiing, and the like in the fixed blade angle regime and for starting the engine. However, in view of the effective control of the engine both with respect to power and temperature through the datum valve, a system such as that disclosed makes it practicable to use a fuel control 16 of less accuracy and complexity than where such a fuel control is relied upon entirely to control the operation of the engine or where it is supplemented by a datum valve responsive only to temperature.

The advantages of this system and of certain sub-combinations thereof and the manner in which the stated objects are achieved thereby will be apparent to those skilled in the art from the preceding detailed description of the preferred embodiment of the invention. It will be understood that this description is not to be regarded as limiting or restricting the invention, since many modifications and substitutions may be made by the exercise of skill in the art within the scope of the invention.

I claim:

1. The combination of a gas turbine engine having a power output shaft, means responsive to engine power output through said shaft for generating a power signal, means responsive to motive fluid temperature in the engine for generating a temperature signal, a discriminator actuated by the power signal and the temperature signal and providing an output signal corresponding to the higher of the two signals, a settable power control for the engine, means actuated by the power control providing a control signal, an adjustable fuel control for the engine, and an actuator for the fuel control normally responsive to the output signal and the control signal adapted to adjust the fuel control to regulate the fuel supplied to the engine so as to equalize the output signal with the control signal.

2. The combination of a gas turbine engine having a power output shaft, means responsive to engine power output for generating a power signal, means responsive to motive fluid temperature in the engine for generating a temperature signal, a discriminator actuated by the power signal and the temperature signal and providing an output signal corresponding to the higher of the two signals, a settable power control for the engine, means actuated by the power control providing a control signal, an adjustable fuel control for the engine, an actuator for the fuel control normally responsive to the output signal and the control signal adapted to adjust the fuel control to regulate the fuel supplied to the engine so as to equalize the output signal with the control signal, means providing a limiting signal, and means actuated by the power control for coupling the fuel control actuator to the means providing the limiting signal instead of the means providing the control signal upon movement of the power control below a predetermined position.

3. The combination of a gas turbine engine having a power output shaft, means responsive to engine power output for generating a power signal, means responsive to engine speed for generating a speed signal, means responsive to motive fluid temperature in the engine for generating a temperature signal, a discriminator actuated by the power signal and the temperature signal and providing an output signal corresponding to the higher of the two signals, a settable power control for the engine, means actuated by the power control providing a control signal, an adjustable fuel control for the engine, an actuator for the fuel control normally responsive to the output signal and the control signal adapted to adjust the fuel control to regulate the fuel supplied to the engine so as to equalize the output signal with the control signal, means providing a limiting signal, means actuated by the speed signal for coupling the fuel control actuator to the means providing the limiting signal instead of the means providing the control signal upon decrease in engine speed below a predetermined value, and means actuated by the power control for coupling the fuel control actuator to the means providing the limiting signal instead of the means providing the control signal upon movement of the power control below a predetermined position.

4. The combination of a gas turbine engine having a power output shaft, means responsive to engine power output for generating a power signal, means responsive to engine speed for generating a speed signal, means responsive to motive fluid temperature in the engine for generating a temperature signal, a discriminator actuated by the power signal and the temperature signal and providing an output signal corresponding to the higher of the two signals, a settable power control for the engine, means actuated by the power control providing a control signal, an adjustable fuel control for the engine, an actuator for the fuel control normally responsive to the output signal and the control signal adapted to adjust the fuel control to regulate the fuel supplied to the engine so as to equalize the output signal with the control signal, and means coupling the speed signal generating means and the output signal generating means effectively decreasing the output signal upon decrease of engine speed.

5. The combination of a gas turbine engine having a power output shaft, means responsive to engine power output for generating a power signal, means responsive to engine speed for generating a speed signal, means responsive to motive fluid temperature in the engine for generating a temperature signal, a discriminator actuated by the power signal and the temperature signal and providing an output signal corresponding to the higher of the two signals, a settable power control for the engine, means actuated by the power control providing a control signal, an adjustable fuel control for the engine, an actuator for the fuel control normally responsive to the output signal and the control signal adapted to adjust the fuel control to regulate the fuel supplied to the engine so as to equalize the output signal with the control signal, means coupling the speed signal generating means and the output signal generating means effectively decreasing the output signal upon decrease of engine speed, means providing a limiting signal, and means actuated by the speed signal for coupling the fuel control actuator to the means providing the limiting signal instead of the means providing the control signal upon decrease in engine speed below a predetermined value.

6. The combination of a gas turbine engine having a power output shaft, means responsive to engine power output for generating a power signal, means responsive to engine speed for generating a speed signal, means responsive to motive fluid temperature in the engine for generating a temperature signal, a discriminator actuated by the power signal and the temperature signal and providing an output signal corresponding to the higher of the two signals, a settable power control for the engine, means actuated by the power control providing a control signal, an adjustable fuel control for the engine, an actuator for the fuel control normally responsive to the output signal and the control signal adapted to adjust the fuel control to regulate the fuel supplied to the engine so as to equalize the output signal with the control signal, means coupling the speed signal generating means and the output signal generating means effectively decreasing the output signal upon decrease of engine speed, means providing a limiting signal, means actuated by the speed signal for coupling the fuel control actuator to the means providing the limiting signal instead of the means providing the control signal upon decrease in engine speed below a predetermined value, and means actuated by the power control for coupling the fuel control actuator to the means providing the limiting signal instead of the means providing the control signal upon movement of the power control below a predetermined piston.

7. The combination of a gas turbine engine having a power output shaft, means responsive to engine power output for generating a power signal, means responsive to engine speed for generating a speed signal, a settable power control for the engine, means actuated by the power control providing a control signal, an adjustable fuel control for the engine, an actuator for the fuel control responsive to the power signal and the control signal adapted to adjust the fuel control to regulate the fuel supplied to the engine so as to equalize the power signal with the control signal, means coupling the speed signal generating means and the power signal generating means for effectively decreasing the power signal upon decrease of engine speed, means providing a fixed limiting signal, means actuated by the speed signal for coupling the actuator to the means providing the fixed limiting signal instead of the means providing the control signal upon decrease in engine speed below a predetermined value, and means actuated by the power control for coupling the actuator to the means providing the fixed limiting signal instead of the means providing the control signal upon movement of the power control below a predetermined position.

8. The combination of a gas turbine engine having a power output shaft, means responsive to engine power output for generating a power signal, means responsive to motive fluid temperature in the engine for generating a temperature signal, a discriminator actuated by the power signal and the temperature signal and providing an output signal corresponding to the higher of the two signals, means providing a limiting signal, an adjustable fuel control for the engine, and an actuator for the fuel control responsive to the output signal and the limiting signal adapted to adjust the fuel control to regulate the fuel supplied to the engine so as to limit the output signal by the limiting signal.

9. The combination of a gas turbine having a power output shaft, a variable load device driven by the output shaft normally operative to maintain output shaft speed at a predetermined value, means responsive to torque transmitted through the output shaft for generating a power signal, means responsive to motive fluid temperature in the engine for generating a temperature signal, a discriminator actuated by the power signal and the temperature signal and providing an output signal corresponding to the higher of the two signals, a settable power control for the engine, means actuated by the power control providing a control signal, and adjustable fuel control for the engine determining fuel supply to the engine, and an actuator for the fuel control normally responsive to the output signal and the control signal adapted to adjust the fuel control to regulate the fuel supplied to the engine so as to equalize the output signal with the control signal.

10. The combination of a gas turbine having a power output shaft, a variable load device driven by the output shaft normally operative to maintain output shaft speed at a predetermined value, means responsive to torque transmitted through the output shaft for generating a power signal, means responsive to motive fluid temperature in the engine for generating a temperature signal, a discriminator actuated by the power signal and the temperature signal and providing an output signal corresponding to the higher of the two signals, a settable power control for the engine, means actuated by the power control providing a control signal, an adjustable fuel control for the engine determining fuel supply to the engine, an actuator for the fuel control normally responsive to the output signal and the control signal adapted to adjust the fuel control to regulate the fuel supplied to the engine so as to equalize the output signal with the control signal, means providing a fixed limiting signal, and means actuated by the power control for coupling the fuel control actuator to the means providing the limiting signal instead of the means providing the control signal upon movement of the power control below a predetermined position.

11. The combination of a gas turbine having a power output shaft, a variable load device driven by the output shaft normally operative to maintain output shaft speed at a predetermined value, means responsive to torque transmitted through the output shaft for generating a power signal, means responsive to engine speed for generating a speed signal, means responsive to motive fluid temperature in the engine for generating a temperature signal, a discriminator actuated by the power signal and the temperature signal and providing an output signal corresponding to the higher of the two signals, a settable power control for the engine, means actuated by the power control providing a control signal, an adjustable fuel control for the engine determining fuel supply to the engine, an actuator for the fuel control normally responsive to the output signal and the control signal adapted to adjust the fuel control to regulate the fuel supplied to the engine so as to equalize the output signal with the control signal, means providing a fixed limiting signal, and means actuated by the speed signal for coupling the fuel control actuator to the means providing the limiting signal instead of the means providing the control signal upon decrease in engine speed below a predetermined value lower than the first said predetermined value.

12. The combination of a gas turbine having a power output shaft, a variable load device driven by the output shaft normally operative to maintain output shaft speed at a predetermined value, means responsive to torque transmitted through the output shaft for generating a power signal, means responsive to engine speed for generating a speed signal, means responsive to motive fluid temperature in the engine for generating a temperature signal, a discriminator actuated by the power signal and the temperature signal and providing an output signal corresponding to the higher of the two signals, a settable power control for the engine, means actuated by the power control providing a control signal, an adjustable fuel control for the engine determining fuel supply to the engine, an actuator for the fuel control normally responsive to the output signal and the control signal adapted to adjust the fuel control to regulate the fuel supplied to the engine so as to equalize the output signal with the control signal, and means coupling the speed signal generating means and the output signal generating means effectively decreasing the output signal upon decrease of engine speed below the said predetermined value.

13. The combination of a gas turbine having a power output shaft, a variable load device driven by the output shaft normally operative to maintain output shaft speed at a predetermined value, means responsive to torque transmitted through the output shaft for generating a power signal, means responsive to engine speed for generating a speed signal, means responsive to motive fluid temperature in the engine for generating a temperature signal, a discriminator actuated by the power signal and the temperature signal and providing an output signal corresponding to the higher of the two signals, a settable power control for the engine, means actuated by the power control providing a control signal, an adjustable fuel control for the engine determining fuel supply to the engine, an actuator for the fuel control normally responsive to the output signal and the control signal adapted to adjust the fuel control to regulate the fuel supplied to the engine so as to equalize the output signal with the control signal, means coupling the speed signal generating means and the output signal generating means effectively decreasing the output signal upon decrease of engine speed below the said predetermined value, means providing a fixed limiting signal, means actuated by the speed signal for coupling the fuel control actuator to the means providing the limiting signal instead of the means providing the control signal upon decrease in engine speed below a predetermined value lower than the first said predetermined value, and means actuated by the power control for coupling the fuel control actuator to the means providing the limiting signal instead of the means providing the control signal upon movement of the power control below a predetermined position.

References Cited in the file of this patent
UNITED STATES PATENTS

| | | |
|---|---|---|
| 2,667,228 | Wood et al. | Jan. 26, 1954 |
| 2,708,826 | Torell | May 24, 1955 |
| 2,764,867 | Farkas | Oct. 2, 1956 |
| 2,772,378 | Farkas | Nov. 27, 1956 |
| 2,861,637 | Best | Nov. 25, 1958 |

UNITED STATES PATENT OFFICE
CERTIFICATION OF CORRECTION

Patent No. 2,977,756                                              April 4, 1961

Milton C. Stone

It is hereby certified that error appears in the above numbered patent requiring correction and that the said Letters Patent should read as corrected below.

Column 1, line 43, for "altitudtes" read -- altitudes --; column 2, line 36, for "hype" read -- type --; column 3, line 70, for "distriminator" read -- discriminator --; column 4, line 21, for "datus" read -- datum --; line 43, for "thet" read -- the --; same column 4, line 47, for "resisatnce" read -- resistance --; column 7, line 11, for "mentioned" read -- mention --; line 48, for "lea" read -- sea --; column 8, line 55, for "therefore" read -- Therefore --; column 9, line 43, for "the" read -- its --; column 11, line 49, for "piston" read -- position --; column 12, line 22, for "and" read -- an --.

Signed and sealed this 29th day of August 1961.

(SEAL)
Attest:

ERNEST W. SWIDER                                      DAVID L. LADD
Attesting Officer                                    Commissioner of Patents